(12) United States Patent
Girard

(10) Patent No.: US 10,449,855 B2
(45) Date of Patent: Oct. 22, 2019

(54) DRIVELINE FOR OFF-HIGHWAY VEHICLES PROVIDED WITH A DUAL FUNCTION CVT

(71) Applicant: TRANSMISSION CVT CORP INC., Sainte-Julie (CA)

(72) Inventor: Daniel Girard, Beloeil (CA)

(73) Assignee: Transmission CVT CORP Inc., Sainte-Julie, Quebec (CA)

( * ) Notice: Subject to any disclaimer, the term of this patent is extended or adjusted under 35 U.S.C. 154(b) by 108 days.

(21) Appl. No.: 15/327,310

(22) PCT Filed: Jul. 27, 2015

(86) PCT No.: PCT/CA2015/050709
§ 371 (c)(1),
(2) Date: Jan. 18, 2017

(87) PCT Pub. No.: WO2016/015150
PCT Pub. Date: Feb. 4, 2016

(65) Prior Publication Data
US 2017/0166051 A1   Jun. 15, 2017

Related U.S. Application Data

(60) Provisional application No. 62/030,692, filed on Jul. 30, 2014.

(51) Int. Cl.
*B60K 17/28*   (2006.01)
*B60K 25/02*   (2006.01)
*B60K 25/06*   (2006.01)
*F16H 37/02*   (2006.01)

(52) U.S. Cl.
CPC .............. *B60K 17/28* (2013.01); *B60K 25/02* (2013.01); *B60K 25/06* (2013.01); *B60K 2025/024* (2013.01); *B60Y 2400/72* (2013.01); *B60Y 2400/73* (2013.01); *F16H 37/022* (2013.01)

(58) Field of Classification Search
CPC ......... B60K 17/28; B60K 25/02; B60K 25/06
See application file for complete search history.

(56) References Cited

U.S. PATENT DOCUMENTS

| | | | | |
|---|---|---|---|---|
| 4,738,326 A * | 4/1988 | Inoue | ................ | B62K 5/01 180/365 |
| 6,116,363 A * | 9/2000 | Frank | ................ | B60K 6/48 180/65.25 |
| 6,668,953 B1 * | 12/2003 | Reik | ................ | B60K 6/08 180/165 |
| 7,295,915 B1 * | 11/2007 | Okubo | ................ | B60K 6/365 701/110 |
| 7,631,719 B2 | 12/2009 | Wenthen | | |

(Continued)

FOREIGN PATENT DOCUMENTS

| | | |
|---|---|---|
| CN | 103492759 | 1/2014 |
| EP | 1637383 | 3/2006 |

(Continued)

*Primary Examiner* — Faye M Fleming
(74) *Attorney, Agent, or Firm* — Fay Kaplun & Marcin, LLP

(57) ABSTRACT

A driveline for vehicles provided with a dual function CVT is described herein. The driveline includes a dual function CVT that can be used both to power the ground engaging wheels of the vehicle and to power an accessory drive thereof.

12 Claims, 7 Drawing Sheets

(56) References Cited

U.S. PATENT DOCUMENTS

| | | |
|---|---|---|
| 8,388,482 B2 | 3/2013 | Honzek |
| 8,479,847 B2 * | 7/2013 | Hart ................. B60K 6/485 |
| | | 180/65.21 |
| 8,480,529 B2 | 7/2013 | Pohl et al. |
| 2010/0174456 A1 | 7/2010 | Beaudoin et al. |
| 2010/0267507 A1 | 10/2010 | Honzek |
| 2014/0045637 A1 * | 2/2014 | Dionne ............. F16H 37/022 |
| | | 475/214 |

FOREIGN PATENT DOCUMENTS

| | | |
|---|---|---|
| WO | 2007/052217 | 5/2007 |
| WO | 2012/145838 | 11/2012 |

\* cited by examiner

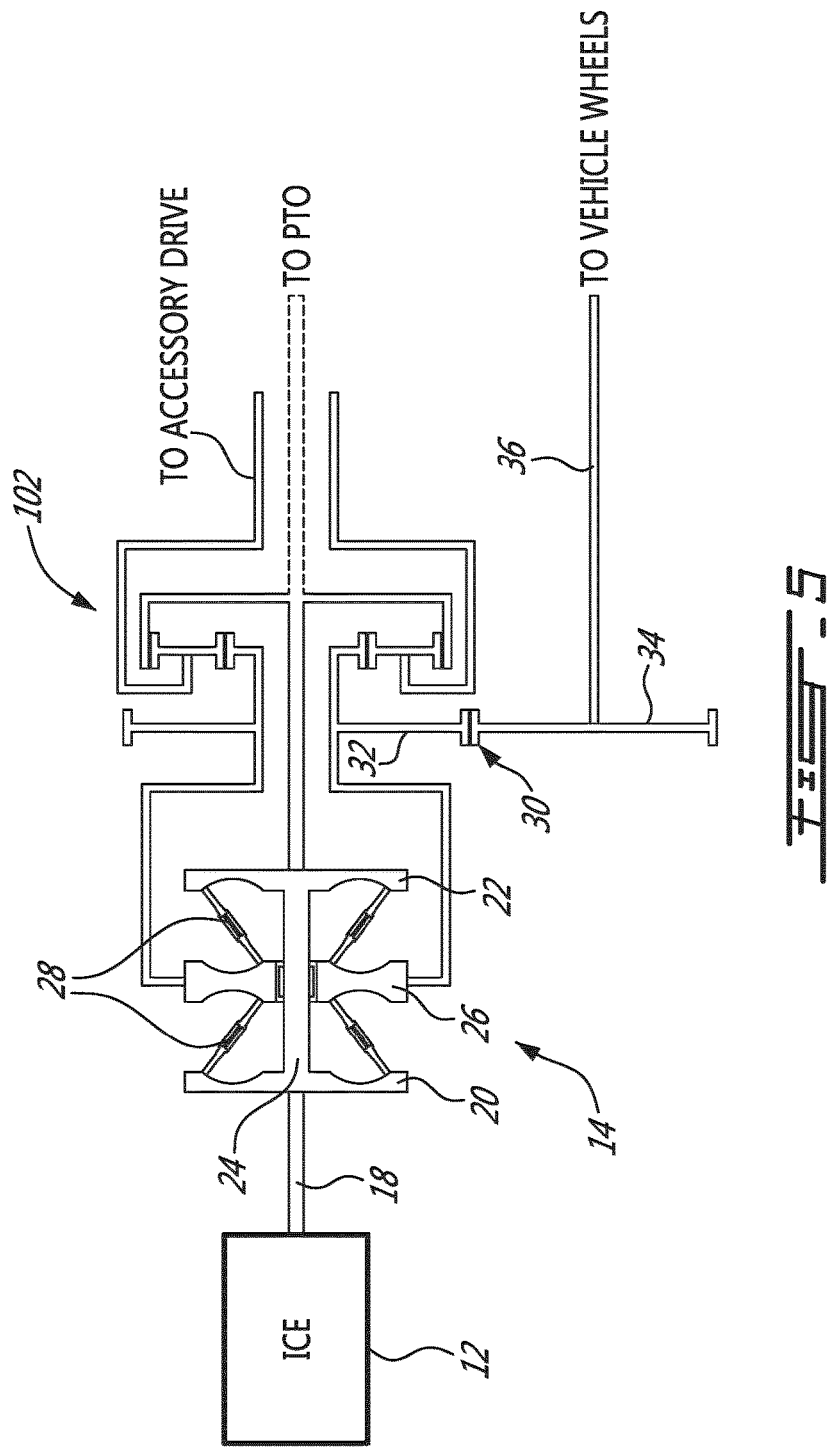

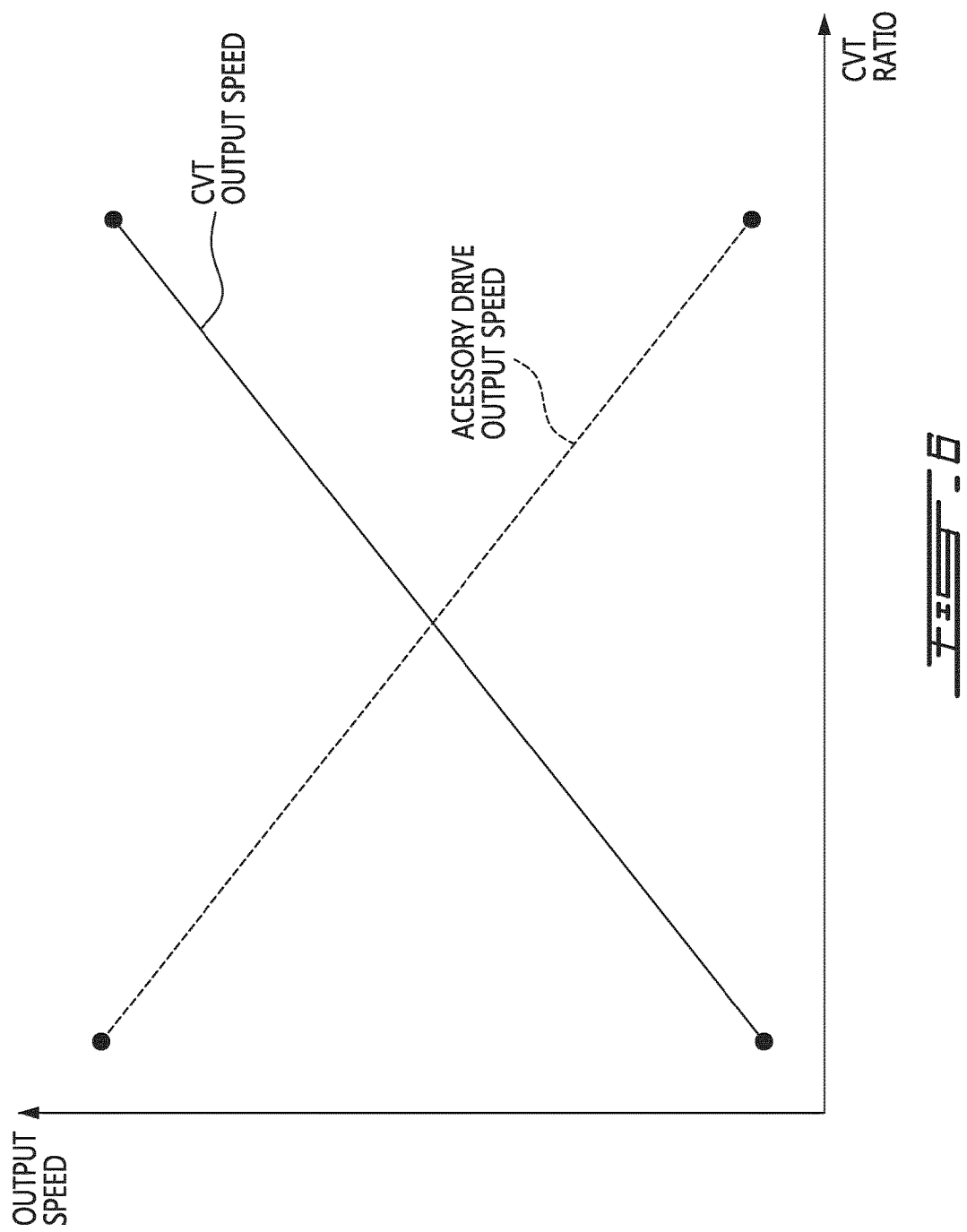

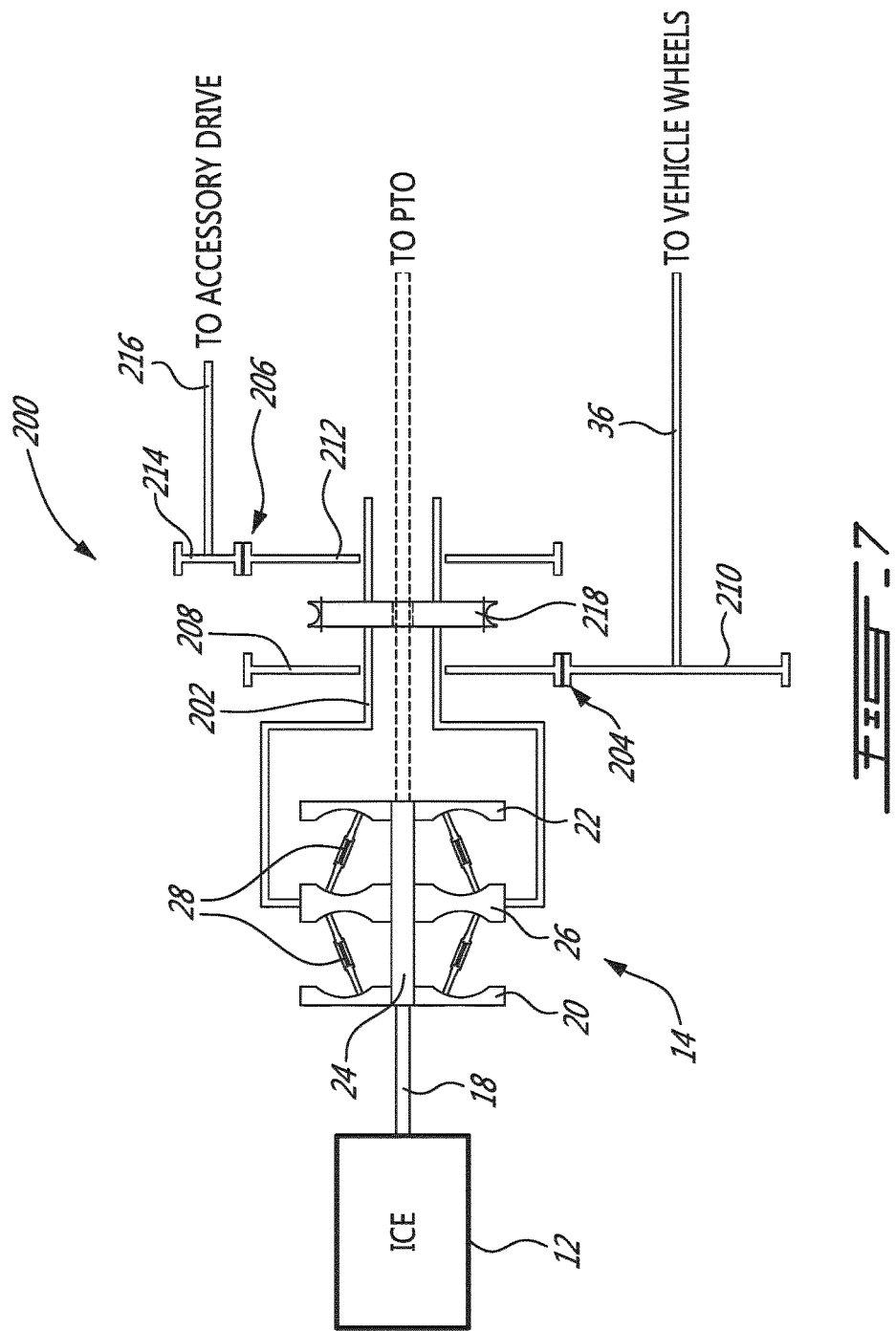

DRIVELINE FOR OFF-HIGHWAY VEHICLES PROVIDED WITH A DUAL FUNCTION CVT

FIELD

The present disclosure generally relates to drivelines including a continuously variable transmission (CVT). More specifically, the present disclosure is concerned with drivelines for off-highway vehicles provided with a dual function CVT.

BACKGROUND

CVTs are very interesting in all kinds of vehicles for their ability to continuously vary the speed ratio between the output of a prime mover and the wheels or other rotating parts of a vehicle.

In some off-highway vehicles, it would be advantageous to be able to use the output of the CVT for other functions than for driving the wheels.

BRIEF DESCRIPTION OF THE DRAWINGS

In the appended drawings:

FIG. 5 is a block diagram similar to FIG. 4 and illustrating the CVT in an overdrive configuration;

FIG. 6 is a graph showing the output speed of the CVT and of the accessory drive shaft with respect to the CVT ratio for the driveline of FIG. 4; and FIG. 7 is a block diagram of a driveline including a dual function CVT according to a third illustrative embodiment.

DETAILED DESCRIPTION

Figure 1:
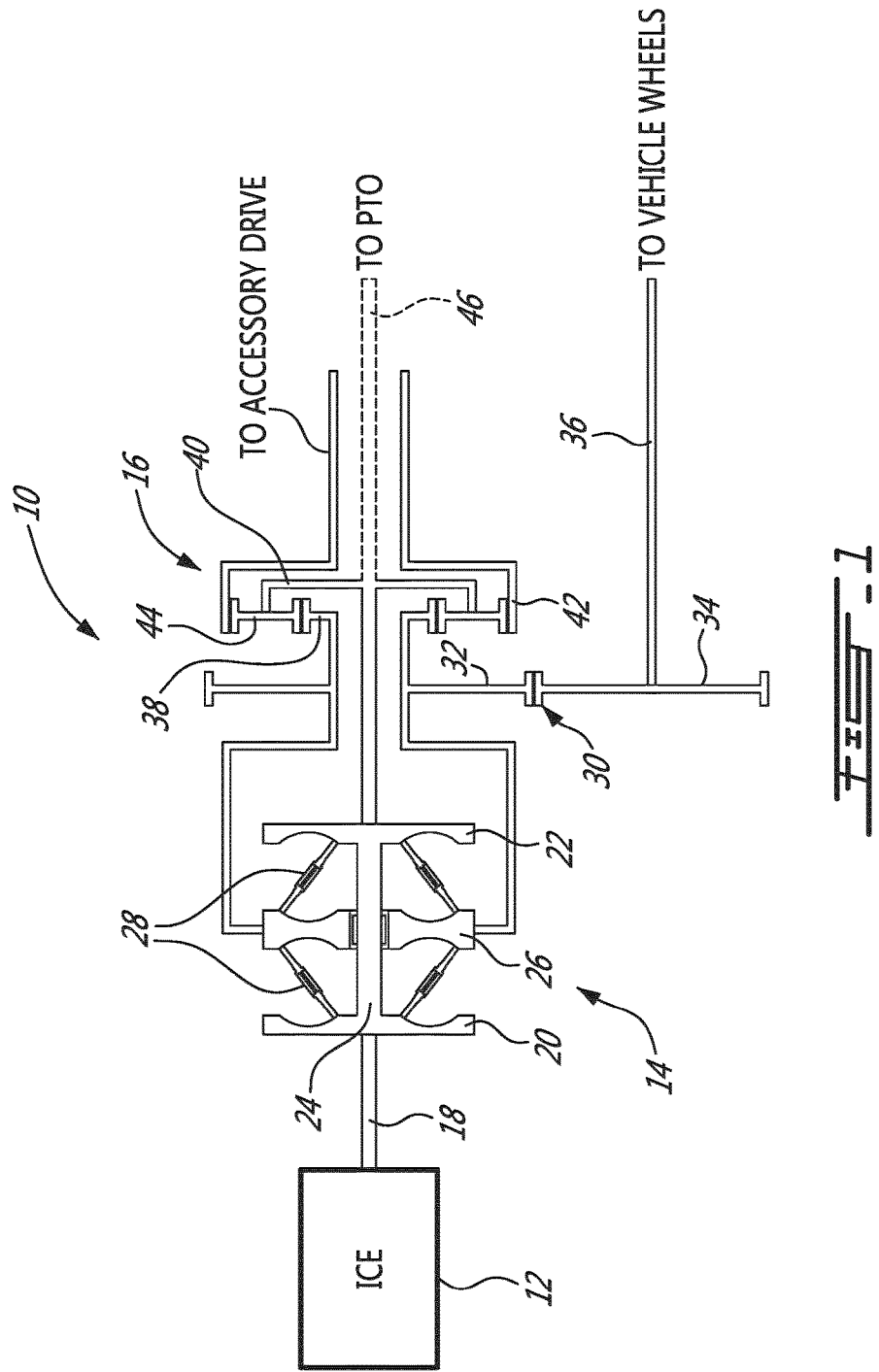
FIG. 1 is a block diagram of a driveline including a dual function CVT according to a first illustrative embodiment; the CVT being shown in an underdrive configuration.

An object is generally to provide an improved driveline including a CVT. More specifically, an object is to provide a driveline for off-road vehicles provided with a dual function CVT where the output of the CVT may be used to drive the wheels of the vehicle and/or drive an accessory drive.

More specifically, according to an illustrative embodiment, there is provided a driveline for a vehicle including ground contacting wheels and an accessory drive. The driveline includes a prime mover having an output shaft and a CVT having an input associated with the output shaft of the prime mover and an output that powers both the ground contacting wheels and the accessory drive.

According to another illustrative embodiment, there is provided a driveline for a vehicle including ground-contacting wheels, a prime mover having an output shaft and an accessory drive. The driveline includes a CVT having an input associated with the output shaft of the prime mover and an output that powers both the ground contacting wheels and the accessory drive.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

It is to be noted that the expression "prime mover" is to be construed herein and in the appended claims as an internal combustion engine (ICE), a turbine engine, or any other mechanical power production element or assembly.

It is to be noted that the expression "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT and a cone CVT.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

It is to be noted that the expression "off-highway vehicle" is to be construed herein and in the appended claims as any type of vehicle that is designed specifically for use off-road, including, amongst others, construction vehicles and agricultural vehicles.

It is to be noted that the expression "accessory drive" is to be construed herein and in the appended claims as any mechanical, electrical or hydraulic component(s) or assembly(ies) of the vehicle other than the traction wheels, that require power from the prime mover.

It is to be noted that the term "driveline", used herein and in the appended claims, are to be construed as the intervening mechanism by which power is transmitted from a prime mover to the wheels of a vehicle as well as this mechanism plus the prime mover.

Other objects, advantages and features of the driveline for off-highway vehicles provided with a dual function CVT will become more apparent upon reading of the following non-restrictive description of illustrative embodiments thereof, given by way of example only with reference to the accompanying drawings.

Figure 2:
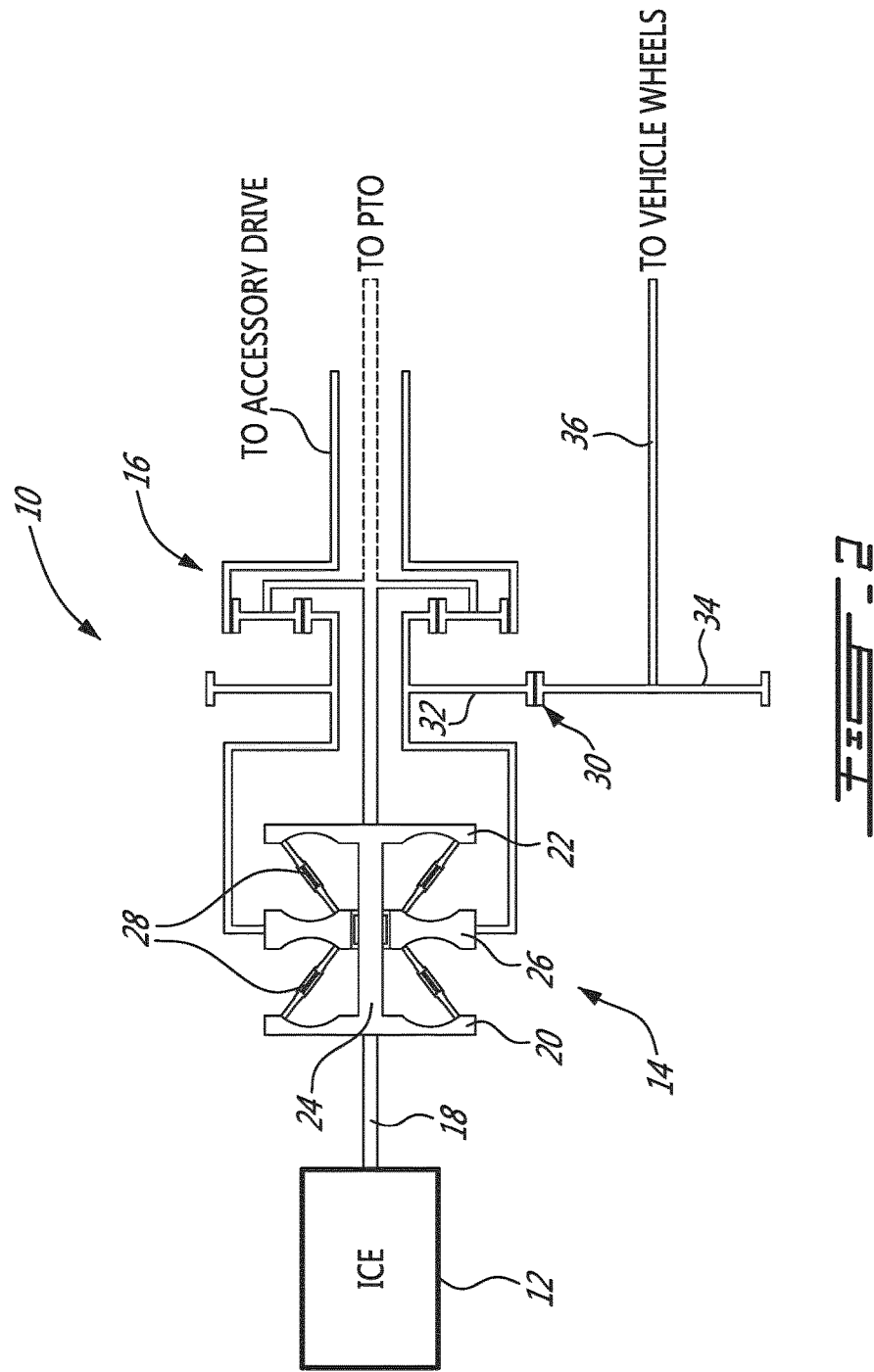
FIG. 2 is a block diagram similar to FIG. 1 and illustrating the CVT in an overdrive configuration.
Figure 3:
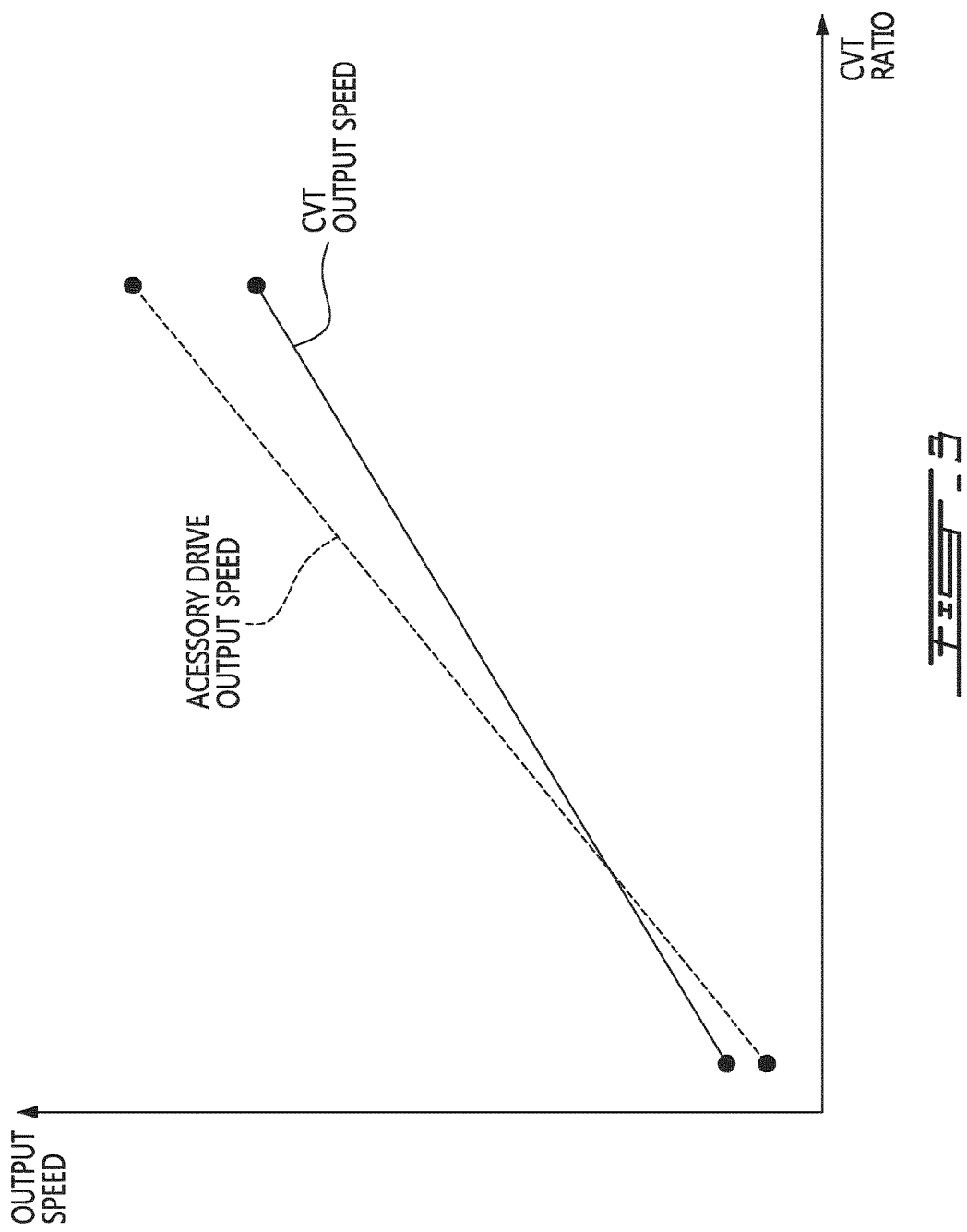
FIG. 3 is a graph showing the output speed of the CVT and of the accessory drive shaft with respect to the CVT ratio for the driveline of FIG. 1.

Turning now to FIGS. 1-3 of the appended drawings, a driveline 10 including a dual-function CVT according to a first illustrative embodiment will be described.

The driveline 10 includes a prime mover in the form of an internal combustion engine (ICE) 12, a dual function CVT 14 and a planetary gear train 16.

The ICE 12 includes an output shaft 18 that is connected to the input disks 20 and 22 of the CVT 14. The input disks 20 and 22 being interconnected by a CVT shaft 24. The output disk 26 of the CVT 14 is rotatably mounted to the CVT shaft 24 and defines the output of the CVT 14. Rollers 28 interconnect the input disks 20 and 22 to the output disk 26 in a conventional manner.

The operation of such a CVT 14 is believed well known and will not be described in details herein. Suffice to say that the angle of the rollers 28 with respect to the CVT shaft 24 determines the CVT ratio.

The first function of the dual-function CVT 14 is to supply power to the wheels (not shown) of the off-highway vehicle. Accordingly, the output disk 26 of the CVT is connected to a gear train 30 including a first gear 32 connected to the output disk 26 and a second gear 34, meshed with the first gear 32 and connected to a shaft 36 which is directly or indirectly connected to the wheels (not shown) of the off-highway vehicle. Accordingly, the rotating speed of the vehicle wheels is determined by the speed of the output shaft 18 and by the ratio of the CVT 14.

The second function of the dual function CVT 14 is to supply power to an accessory drive. The driveline 10 of FIGS. 1-2 can supply power to both the wheels and to the accessory drive simultaneously at different rotational speeds. To do so, the planetary gear train 16 includes a first input in the form of a sun gear 38 connected to the output disk 26 of the CVT 14; a second input in the form of a planet carrier 40 connected to the input disks 22-24 of the CVT 14; an output in the form of a ring gear 42 defining the accessory drive and planets 44 interconnecting the sun gear 38 and the ring gear 42 in a conventional manner.

FIG. 1 illustrates the driveline 10 in a full underdrive position, i.e. where the output disk 26 rotates at its lower relative speed while FIG. 2 illustrates the driveline 10 in a full overdrive position, i.e. where the output disk 26 rotates at its higher relative speed.

In operation, since the input and output disks of the CVT are always rotating in opposite directions, the sun gear 38 and the planet carrier 40 are also rotating in opposite directions with the sun gear 38 having a speed that can be either slower or faster than the planet carrier 40 depending on the selected CVT ratio. The resulting rotation speed of the ring gear 44 therefore varies with the ratio of the CVT 14 in the same direction as the planet carrier 40. In other words, the ring gear 44 rotates in the same direction as the planet carrier 40 and its speed increases as the CVT ratio increases.

FIG. 3 illustrates, in full line, the CVT output speed with respect to the CVT ratio and, in dashed lines, the speed of the accessory drive with respect to the CVT ratio. It is to be noted that the slope of the accessory drive speed and the CVT ratio value at which the two elements are at the same speed is dependent on many factors, including the various gear ratios of planetary gear train 16. Therefore, for particular off-highway vehicles, the gear ratios can be calculated to yield particular accessory drive speeds at particular CVT output speeds.

It will be apparent to one skilled in the art that since other elements, such as a multi-speed transmission, can be provided between the output shaft 36 and the wheels (not shown) of the vehicle, it is possible to somewhat vary the ground speed of the vehicle while keeping a constant accessory drive speed.

It will also be apparent to one skilled in the art that the CVT 14 simultaneously provides power to both the vehicle wheels and the accessory drive.

As will be understood by one skilled in the art, a clutch arrangement (not shown) can be provided between the ring gear 42 and the accessory drive to allow the selective disconnection of the accessory drive from the driveline.

Optionally, the driveline 10 may be provided with a conventional PTO shaft 46 (shown in dashed lines) to drive accessories at the same speed as the ICE output shaft 18.

Figure 4:
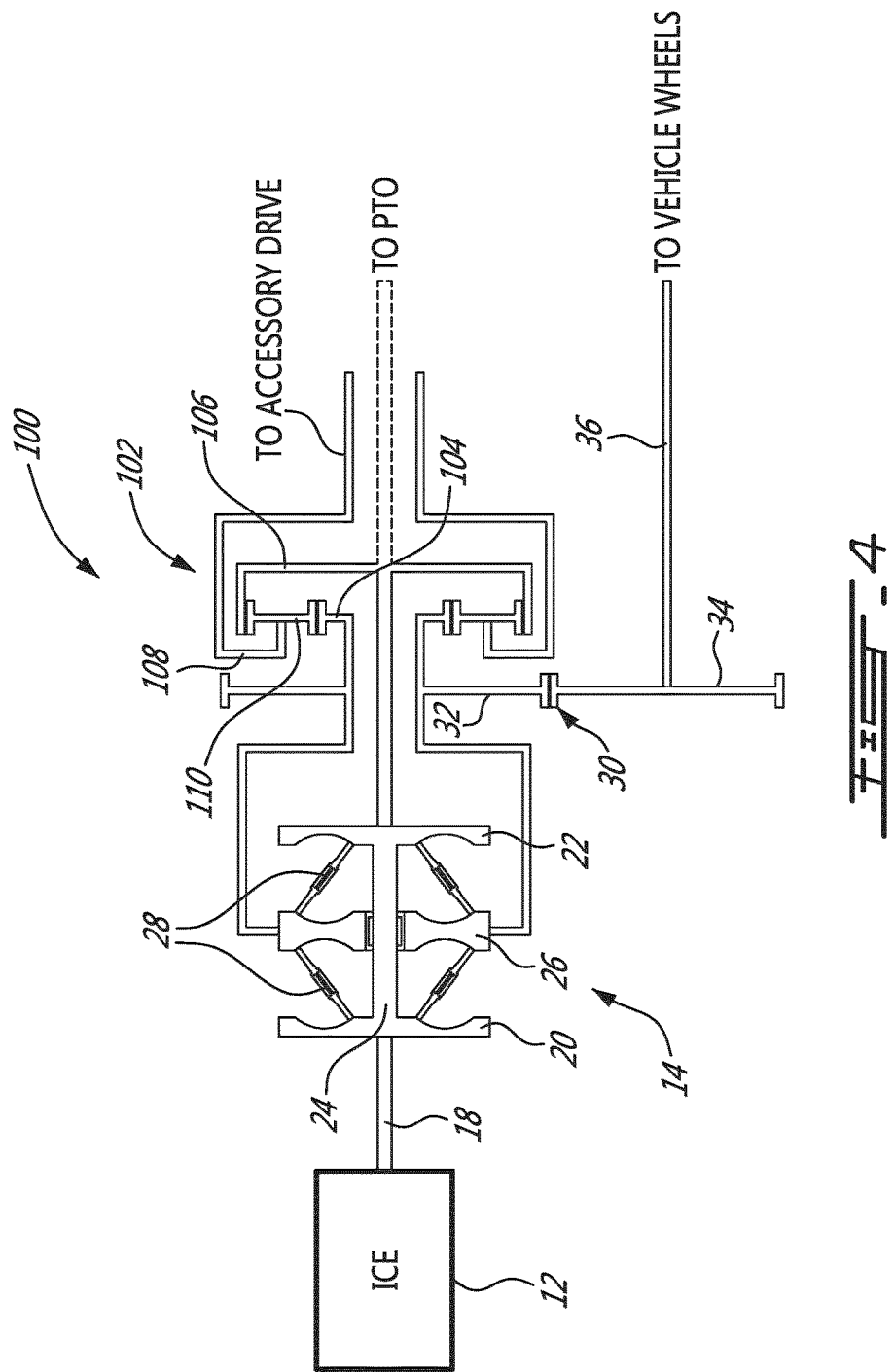
FIG. 4 is a block diagram of a driveline including a dual function CVT according to a second illustrative embodiment; the CVT being shown in an underdrive configuration.

Turning now to FIGS. 4-6 of the appended drawings, a driveline 100 according to a second illustrative embodiment will be described. Since the driveline 100 is very similar to the driveline 10 described hereinabove, only the differences will be discussed hereinbelow, for concision purpose.

Generally stated, the main difference between these two drivelines concerns the interconnection of the planetary gear train 102 to the various elements of the driveline.

More specifically, in the driveline 100, the sun gear 104 is connected to the output disk 26 of the CVT 14; the ring gear 106 is connected to the input disks 22-24 of the CVT 14 and the planet carrier 108 defines the accessory drive output. Of course, planet gears 110 conventionally interconnect the sun gear 104 and the ring gear 106.

FIG. 4 illustrates the driveline 100 in a full underdrive position, i.e. where the output disk 26 rotates at its lower relative speed while FIG. 5 illustrates the driveline 100 in a full overdrive position, i.e. where the output disk 26 rotates at its higher relative speed.

In operation, since the input and output disks of the CVT are always rotating in opposite directions, the sun gear 104 and the ring gear 108 are also rotating in opposite directions with the sun gear 104 having a speed that can be either slower or faster than the ring gear 108 depending on the selected CVT ratio. Since the ring gear 108 is significantly larger than the sun gear, the planet carrier 106 rotates in the same direction as the ring gear 106 and as a resulting speed that varies inversely with the ratio of the CVT 14. In other words, as the ratio of the CVT increases, therefore increasing the CVT output speed, the accessory drive speed decreases.

This is apparent from FIG. 6 of the appended drawings which illustrates, in full line, the CVT output speed with respect to the CVT ratio and, in dashed lines, the speed of the accessory drive with respect to the CVT ratio. It is to be noted that the slope of the accessory drive speed and the CVT ratio value at which the two elements are at the same speed is dependent on many factors, including the various gear ratios of planetary gear train 102.

It will be apparent to one skilled in the art that since other elements can be provided between the output shaft 36 and the wheels (not shown), it is possible to somewhat vary the ground speed of the vehicle while keeping a constant accessory drive speed.

Again, it will also be apparent to one skilled in the art that the CVT 14 simultaneously provides power to both the vehicle wheels and the accessory drive.

This configuration is interesting when used, for example, in agricultural vehicles that use hydraulic pumps (not shown) connected to the accessory drive and used when the ground speed is low. For example, a loader tractor uses its hydraulically powered attachments when it is stopped or travels at low ground speeds. When this is the case, the CVT ratio is set to full underdrive (see FIG. 4), and the speed of the accessory drive is at its fastest. At the other end of the scale, when the tractor travels at full speed and does not use its attachments, the CVT ratio is set at full overdrive (see FIG. 5) and the unused hydraulic pumps are at their lower speeds.

One skilled in the art will understand that the planetary gear train can, in some instances, be designed so that the output speed thereof is zero when the CVT ratio is set to full overdrive. As will be understood by one skilled in the art, a clutch arrangement (not shown) can be provided between the planet carrier 108 and the accessory drive to allow the selective disconnection of the accessory drive from the driveline.

One skilled in the art will also understand that even though two connection configurations of the planetary gear train to the CVT and to the accessory drive have been described hereinabove, other interconnection would be possible.

Turning now to FIG. 7 of the appended drawings, a driveline 200 according to a third illustrative embodiment will be described.

The driveline 200 includes a prime mover 12 and a CVT 14 but generally lacks a planetary gear train. Indeed, the output disk 26 of the CVT 14 is connected to a shaft 202 onto which a first and a second gear pairs 204 and 206 are mounted.

More specifically, the first gear pair 204 includes a gear 208 rotatably mounted to the shaft 202 and a gear 210 meshed with the gear 208 and connected to the output shaft 36. The second gear pair 206 includes a gear 212 rotatably mounted to the shaft 202 and a gear 214 meshed with the gear 212 and connected to the accessory drive shaft 216.

The driveline 200 further includes a synchro 218 so configured as to removable fix one of the gears 208 and 212 to the shaft 202 for rotation therewith.

One skilled in the art will understand that the synchro 218, shown schematically in FIG. 7, is illustrated in a neutral state. It may however move to the right to connect the output of the CVT to the accessory drive or to the left to connect the output of the CVT to the wheels, under the action of an actuator (not shown).

Accordingly, an off-highway vehicle provided with the driveline 200 can use the output of the CVT 14 to power the ground contacting wheels to move the vehicle to a specified work location and then, when the vehicle is stopped, use the output of the CVT to power the accessory drive to drive its attachments, for example.

It will be understood that the synchro 218 could be replaced by other type of selection mechanism such as, for example, clutches.

One skilled in the art will understand that while the gear pairs 204 and 206 are shown being of the same size, these gear pairs can be selected according to the required speed required for the wheels and the accessory drive.

As discussed hereinabove, one skilled in the art will understand that other transmission elements could be provided between the output shaft 36 and the wheels (not shown) of the off-highway vehicle. Clutches, synchros and differential transmissions are part of these transmission elements.

One skilled in the art will also understand that while a toroidal CVT has been illustrated as the CVT in the appended drawings, other types of CVT including variable-diameter pulleys CVTs, Magnetic CVTs, ratcheting CVTs, hydrostatic CVTs and cone CVTs could be used. Of course, some modifications to the interconnection of the elements could be required to account for the direction of rotation of the CVT elements, which may vary depending on the CVT technology used.

One skilled in the art will understand that the diagrams of FIGS. 1, 2, 4, 5 and 7 are very schematic and that many other elements are required for an actual driveline to work.

It is to be understood that the driveline for off-highway vehicles provided with a dual function CVT is not limited in its application to the details of construction and parts illustrated in the accompanying drawings and described hereinabove. The driveline for off-highway vehicles provided with a dual function CVT is capable of other embodiments and of being practiced in various ways. It is also to be understood that the phraseology or terminology used herein is for the purpose of description and not limitation. Hence, although the driveline for off-highway vehicles provided with a dual function CVT has been described hereinabove by way of illustrative embodiments thereof, it can be modified, without departing from the spirit, scope and nature thereof.

What is claimed is:

1. A driveline for a vehicle including ground contacting wheels and an accessory drive, the driveline including:
   a prime mover having an output shaft;
   a CVT having an input associated with the output shaft of the prime mover and an output that powers both the ground contacting wheels and the accessory drive; and
   a planetary gear train including a first input connected to the output shaft of the prime mover, a second input connected to the output of the CVT and an output connected to the accessory drive.

2. A driveline as recited in claim 1, wherein the first input is a planet carrier of the planetary gear train, the second input is a sun gear of the planetary gear train and the output is a ring gear of the planetary gear train.

3. A driveline as recited in claim 1, wherein the first input is a ring gear of the planetary gear train, the second input is a sun gear of the planetary gear train and the output is a planet cagier of the planetary gear train.

4. A driveline as recited in claim 1, wherein the CVT is a toroidal CVT.

5. A driveline as recited in claim 1, further comprising a PTO output connected to the output shaft of the prime mover.

6. A driveline as recited in claim 1, wherein the prime mover includes an internal combustion engine (ICE).

7. A driveline for a vehicle including ground contacting wheels a prime mover having an output shaft and an accessory drive, the driveline including: a CVT having an input associated with the output shaft of the prime mover and an output that powers both the ground contacting wheels and the accessory drive; and a planetary gear train including a first input connected to the output shaft of the prime mover, a second input connected to the output of the CVT and an output connected to the accessory drive.

8. A driveline as recited in claim 7, wherein the first input is a planet carrier of the planetary gear train, the second input is a sun gear of the planetary gear train and the output is a ring gear of the planetary gear train.

9. A driveline as recited in claim 7, wherein the first input is a ring gear of the planetary gear train, the second input is a sun gear of the planetary gear train and the output is a planet carrier of the planetary gear train.

10. A driveline as recited in claim 7, wherein the CVT is a toroidal CVT.

11. A driveline as recited in claim 7, further comprising a PTO output connected to the output shaft of the prime mover.

12. A driveline as recited in claim 7, wherein the prime mover includes an internal combustion engine (ICE).

* * * * *